(12) United States Patent
Wilson

(10) Patent No.: US 6,975,250 B2
(45) Date of Patent: Dec. 13, 2005

(54) METHODS AND SYSTEMS FOR DATA MANIPULATION

(75) Inventor: Sophie Wilson, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 136 days.

(21) Appl. No.: 10/288,592

(22) Filed: Nov. 6, 2002

(65) Prior Publication Data

US 2003/0222886 A1 Dec. 4, 2003

Related U.S. Application Data

(60) Provisional application No. 60/383,129, filed on May 28, 2002.

(51) Int. Cl.[7] ............................................. H03M 7/00
(52) U.S. Cl. ............................. 341/50; 341/51; 341/58
(58) Field of Search ............................ 341/50, 51, 58; 712/213, 209, 211; 717/118, 210

(56) References Cited

U.S. PATENT DOCUMENTS

| | | | | |
|---|---|---|---|---|
| 5,819,117 A | | 10/1998 | Hansen ........................ 395/898 |
| 5,896,519 A | * | 4/1999 | Worrell ........................ 712/213 |
| 5,915,109 A | * | 6/1999 | Nakakimura et al. ........ 712/221 |
| 6,338,132 B1 | * | 1/2002 | Kyker et al. ................. 712/211 |
| 6,463,521 B1 | * | 10/2002 | Long ............................ 712/213 |
| 6,694,357 B1 | * | 2/2004 | Volnak ......................... 709/218 |
| 6,772,341 B1 | * | 8/2004 | Shrader et al. .............. 713/175 |
| 6,806,819 B2 | * | 10/2004 | Hoffmann .................... 341/100 |
| 2002/0116602 A1 | | 8/2002 | Kissell et al. ................ 712/223 |

FOREIGN PATENT DOCUMENTS

GB      2 352 066      7/1999

OTHER PUBLICATIONS

Lee, R. and Huck, J., "*64–bit and Multimedia Extensions in the PA–RISC 2.0 Architecture*", Digest of Papers of COMPCON (Computer Society Conference), IEEE COMP. SOC. Press, Conf. 41, Feb. 1996.

European Search Report issued Jul. 12, 2002 for Appln. No. EP03253301, 3 pages.

* cited by examiner

*Primary Examiner*—Brian Young
(74) *Attorney, Agent, or Firm*—Sterne, Kessler, Goldstein & Fox P.L.L.C.

(57) ABSTRACT

A method of and device for performing a data expansion operation on a plurality of input data objects to generate expanded output data objects is disclosed. The method comprises receiving and decoding a data manipulation instruction defining a data expansion operation, a portion of the data manipulation instruction indicating an expansion operation from a number of predetermined types of data manipulation operations. The method includes generating one or more expansion objects responsive to the indication of an expansion operation, said expansion objects being for use in extending an input data object. The input data objects and said expansion objects are manipulated according to control information programmed to produce a set of expanded output data objects.

23 Claims, 7 Drawing Sheets

METHODS AND SYSTEMS FOR DATA MANIPULATION

This application claims priority to Provisional U.S. Patent Application No. 60/383,129, filed May 28, 2002, which is incorporated herein by reference in its entirety.

FIELD OF THE INVENTION

This invention relates to methods and devices for data expansion operations which promote efficient processing.

BACKGROUND OF THE INVENTION

Modern computer systems use a wide variety of architectures. One particular computer architecture that has proved useful is the single instruction multiple data (SIMD) architecture, which has found application in general purpose computing as well as specific applications, such as media and graphics processing.

An advantage to SIMD architectures includes the capacity to perform parallel processing of multiple data streams while reducing the total number of instructions. For example, one particular instruction type used by SIMD processors is a permutation, or "deal" instruction, which is typically used for re-ordering bytes or words of data from one sequence to a second sequence. For instance, a graphics application may require that a stream of data having four data objects arranged in a first sequence {A, B, C, D} be rearranged to the order {B, A, C, D} and, optionally, expanded into four separate double-sized data objects {0x00, 0x00, 0x00, B}, {0x00, 0x00, 0x00, A}, {0x00, 0x00, 0x00, C}, {0x00, 0x00, 0x00, D}. Examples of data manipulations involving expansion of the input data objects include sign expansion and zero expansion operations.

As processing power increases, the number and size of data objects in the input data sequences also increases. Known methods for manipulating sequences of data objects are unnecessarily complex, leading to more processor cycles, delays and an unnecessary burden on programmers who are required to find feasible ways of configuring the many types of manipulations required.

Accordingly, preferred embodiments of this invention seek to provide a new technology that uses a permuter to perform expansion instructions. In particular, preferred embodiments use a standard permuter in a manner which reduces the number of operations required to achieve certain data manipulations and lessens the burden on the programmer of generating control information for data manipulations.

SUMMARY OF THE INVENTION

According to an aspect of the present invention, there is provided a method of performing a data expansion operation on a plurality of input data objects to generate expanded output data objects. The method comprises receiving and decoding a data manipulation instruction defining a data expansion operation, a portion of the data manipulation instruction indicating an expansion operation from a number of predetermined types of data manipulation operations. Responsive to the indication of an expansion operation one or more expansion objects are generated, the or each expansion object being for use in extending an input data object. The input data objects and said expansion objects are manipulated according to control information programmed to produce a set of expanded output data objects.

In one embodiment, the predetermined types of data manipulation include permutation manipulations without data expansion. In other embodiments, the predetermined types of data manipulation include a plurality of data expansion-type operations, for example sign expansion operations and zero expansion operations. In a preferred embodiment, the predetermined types of data expansion include permutation manipulations without data expansion and a plurality of different types of expansion operations. The step of manipulating according to a control value uses the same manipulation technique irrespective of the overall type of manipulation being performed, i.e. irrespective of whether the data manipulation is a sign expansion, a data expansion or a permutation without an expansion.

According to another aspect of the present invention there is provided a device for performing a data expansion operation on a plurality of input data objects to generate expanded output data objects. The device comprises a decoder for receiving and decoding a data manipulation instruction defining a data expansion operation, a portion of the data manipulation instruction indicating an expansion operation from a number of predetermined types of data manipulation operations. The device also comprises an expansion object generator operable to generate one or more expansion objects responsive to the indication of an expansion operation, the or each expansion object being available for use in expanding an input data object. A manipulation stage is provided to manipulate said input data objects and said expansion objects according to control information programmed to produce a set of expanded output data objects.

According to another aspect of the present invention there is provided a method of performing a data expansion operation on a plurality of input data objects, the method comprising determining from an instruction whether a data expansion operation is required from a plurality of predetermined data manipulation operations including a permute operation without data expansion, generating expansion objects in dependence on said determination indicating a data expansion operation is required, and controlling manipulation of said input data objects and said expansion objects to provide expanded output objects.

According to another aspect of the present invention there is provided a method of manipulating a plurality of input data objects to generate an output data set comprising a plurality of output data objects according to control information, the control information controlling relative positions of respective ones of the output data objects in the output data set. The method comprises receiving and decoding a data manipulation instruction defining a data manipulation operation, the data manipulation instruction comprising a field designating one of a plurality of devices for holding said control information and a field specifying the location of the control information in the designated device. The data is manipulated according to the control information from the specified location in the designated device to produce objects of an output data set, and the output data set is output.

Preferably, the data manipulation instruction comprises an opcode field defining a data manipulation operation and designating one of a plurality of devices holding said control information, and a control field indicating where in the designated device the control information is held.

According to another aspect of the present invention, there is provided a method of manipulating a plurality of input data objects to generate an output data set comprising a plurality of output data objects according to control information, the control information controlling relative positions of respective ones of the output data objects in the output data set. The method comprises receiving and decoding a data manipulation instruction defining a data manipulation operation, the data manipulation instruction indicating the type of manipulation to be performed from a number of predetermined types of data manipulation operations. Next, there is performed, in dependence on the type of data manipulation operation indicated in the instruction, a data preparation step to generate a set of prepared data objects including said input data objects. Finally the prepared data objects are manipulated according to control information to produce output data objects of an output data set and the output data set is output.

According to another aspect of the present invention, there is provided a device for manipulating a plurality of input data objects to generate an output data set comprising a plurality of output data objects according to control information, the control information controlling relative positions of respective ones of the output data objects in the output data set. The device comprises means for receiving and decoding a data manipulation instruction defining a data manipulation operation, wherein the data manipulation instruction indicates the type of manipulation to be performed from a number of predetermined types of data manipulation operations. There is also provided means for performing, in dependence on the type of data manipulation operation indicated in the instruction, a data preparation step to generate a set of prepared data objects including said input data objects. Finally the prepared data objects including said input data objects are manipulated by manipulation means according to control information to produce output data objects of an output data set. The output data set is output via output data means.

Preferably, the decoding means comprises means for detecting whether the instruction is an expansion-type instruction or a permute without expansion. Further, if the instruction is a type of expansion operation, the decoding means preferably also comprises means for detecting the type of expansion operation, say from sign expansion-type and zero expansion-type operations. In the case of a sign expansion operation, the means for performing the data preparation step prepares sign objects for use in the overall expansion. In the case of a zero expansion operation, the means for performing the data preparation step prepares zero objects for use in the overall expansion.

Other features and advantages will become apparent in the following description and accompanying figures.

DETAILED DESCRIPTION OF AN EMBODIMENT

Figure 1:
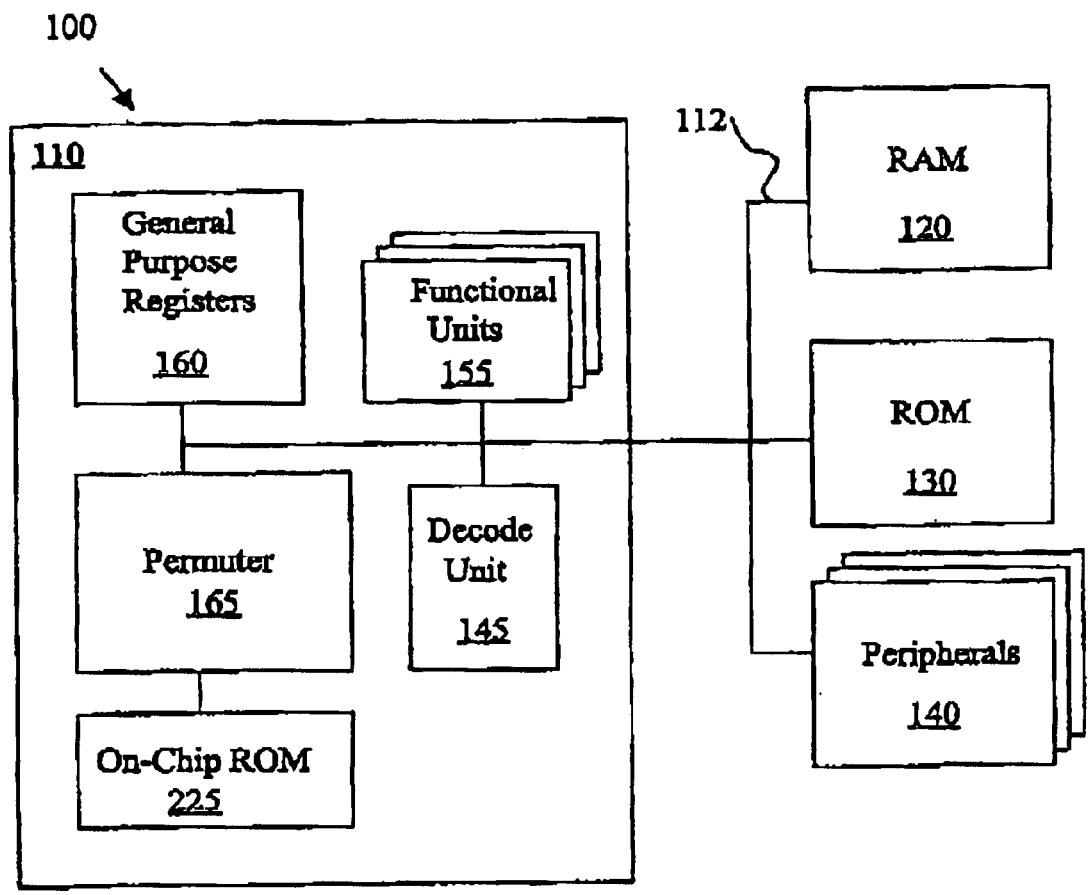
FIG. 1 is a block diagram of a computer system embodying the present invention.

FIG. 1 depicts a computer system 100 embodying the present invention and capable of performing various data manipulation operations. As shown in FIG. 1, the computer system 100 includes a processor 110, a random access memory (RAM) 120, a read only memory (ROM) 130 and a number of peripherals 140. The above devices 110–140 are coupled together using data/address bus 112. While the exemplary computer system 100 uses a bussed-architecture, it should be appreciated that the functions of the various components 110–140 can be realized using any number of architectures, such as architectures based on dedicated electronic circuits and the like.

The processor 110 contains a decode unit 145, functional units 155, a set of general purpose registers 160 and a permuter 165. The permuter 165 is connected to on-chip ROM 225. Although not explicitly shown, the functional units 155 of the exemplary computer system 100 include an integer unit, a Galois field unit, a Multiply Accumulate unit, and a load/store unit. The general purpose register set 160 can contain any number of registers useable by the processor 110 to perform any number of generalized operations and control functions. A skilled person will appreciate that the various components and functional units of the computer system 100 will vary in accordance with the intended application.

In operation, the processor 110 can execute various instructions which may be stored in one of the memories 120,130. The decode unit 145 of the processor 110 can fetch instructions from the instruction bearing memories 120,130 and has associated control circuitry to control supply of data and information between the various components of the processor 110. Instructions which may be processed by the processor 110 support a general purpose set of data processing operations and data manipulation operations. The permuter 165 performs the data manipulation operations. These data manipulation operations include "normal" data deal operations for rearranging a set of input bytes to produce a set of output bytes in a different sequence, data compression operations and/or data expansion operations. In general, a data compression operation involves generating a set of output data objects which have a smaller overall bit-width than the set of input data objects; a data expansion operation involves generating a set of output data objects which have a larger overall bit-width than the set of input data objects. Preferred embodiments can receive an input data set having subsets of data objects arranged in one of a number of predetermined formats and generate an output data set with expanded or compressed data objects in any desired sequence.

The permuter 165 of the computer system 100 is capable of performing data expansion operations which sign extend data objects in the data set supplied to it. The permuter 165 is also capable of performing data expansion operations which zero extend data objects in the data set supplied to it. The various modes of operation of the permuter 165 and the advantageous types of operations it can perform will be explained in more detail hereinafter.

Figure 2:
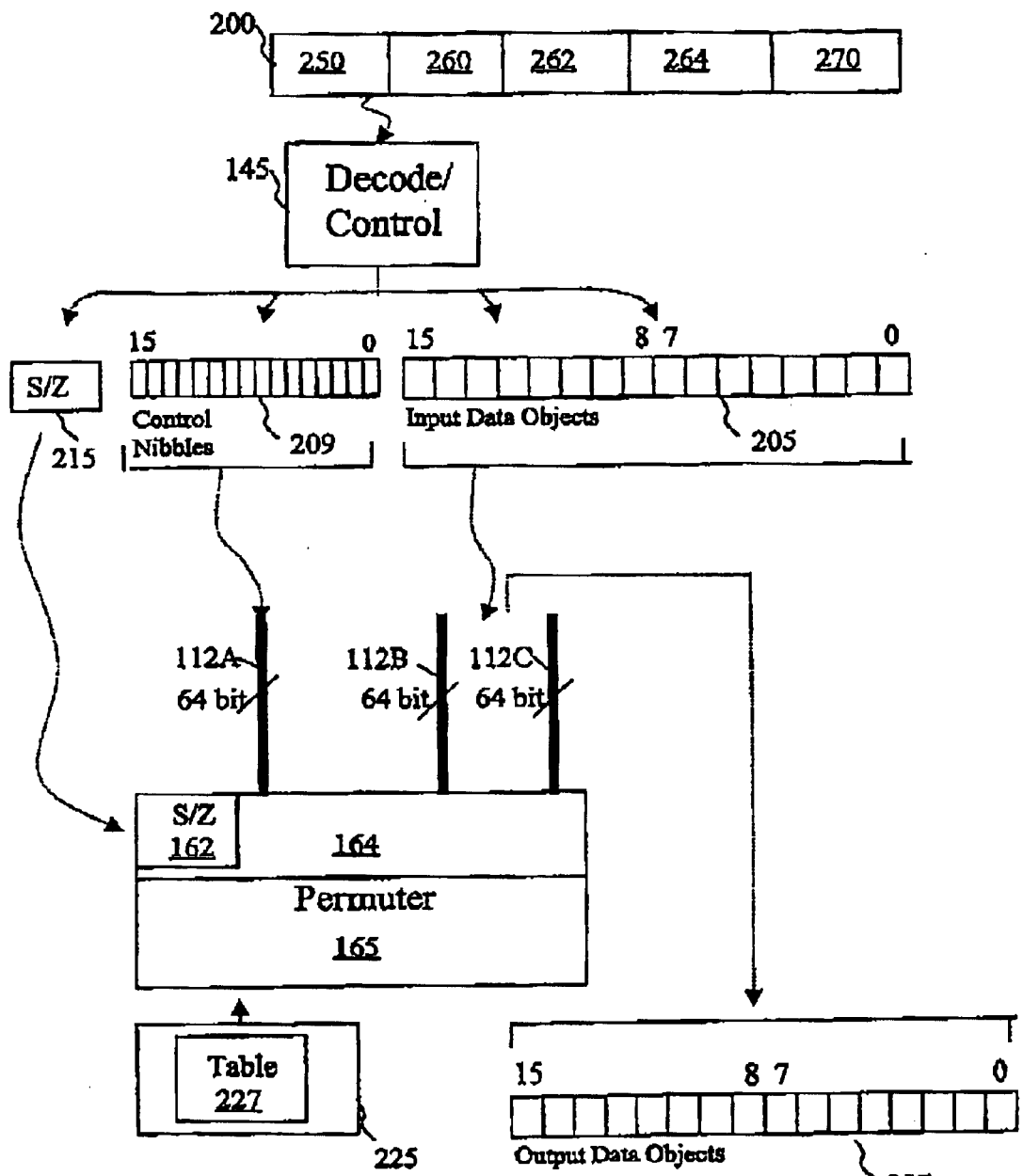
FIG. 2 is a schematic diagram showing a general mode of operation of the computer system of FIG. 1.

As shown in FIG. 2, the decode unit 145 receives an SIMD data manipulation instruction 200 from one of the memories 120,130. The instruction 200 includes an opcode field 250 indicating the type of data manipulation operation to be performed by the permuter 165, a control field 260 designating the location of a control word to control the manner in which objects are manipulated to produce output data objects, a source field 262 indicating the source of objects to be manipulated, a destination field 264 indicating a destination for output data objects, and an optional conditional execution field 270 which can be used if it is desired to perform the SIMD data manipulation operation conditionally on a per SIMD lane basis. For the purposes of this description the optional conditional execution field 270 may be regarded as spare bits and a skilled person will appreciate they may alternatively be used for another desired function or not used at all. Likewise, zero or sign expansion operations such as those performed by preferred embodiments do not rely on the predicate bits. Likewise the source and destination could potentially be the same; that is only one of the fields 262 and 264 may be used in other embodiments.

The type of data manipulation defined in the opcode 250 of the exemplary instruction 200 may be a "normal" data deal operation in which the sequence of input data objects is merely rearranged in accordance with a control word. The opcode 250 may also define a sign expansion or zero expansion operation.

The "sign expansion" and "zero expansion" operations are identified during the decode process performed by the decode/control circuit 145 and indicated by signals S and Z, respectively (see reference numeral 215). If the operation is a sign expansion operation or a zero expansion operation, the permuter receives a signal S or Z at the control port 162 in an input block 164 of the permuter. In this embodiment, the signal S indicates a sign expansion operation, whereas the signal Z indicates a zero expansion operation. To prepare input data for a sign or zero expansion operation the input block 164 performs a data preparation task, as will be described in more detail hereinafter. If there is no control signal S,Z at the control port 162 the permuter input block 164 treats the operation as a "normal data deal" operation and does not need to prepare the data in any way. Any mechanism of coding the relevant information can be used to achieve this end. A skilled person will appreciate there are other suitable coding techniques.

In this example, the source field 262 and destination field 264 designate the addresses of registers, for example, in the general purpose register set 160. Each field 262,264 can be used to designate an individual register or an odd/even register pair in dependence on the type of data manipulation defined in the instruction. In this embodiment the general purpose registers are each 64 bit registers and so designating a single source register may cause the permuter to act on 8 bytes, 4 half words, 2 words or a long. If a register pair is designated the permuter may act on 16 bytes, 8 half words, 4 words or a double long. A set of data objects output from a permuter operation may have the same overall bit-width as the input data set, a smaller bit-width or a larger bit-width, depending on whether the permuter acts to merely reorder the sequence of input data objects, or compress or expand them as well.

The various operations are achieved through judicious selection of operation type, control word and appropriately sized sources and destinations. In the example of FIG. 2, the input data set 205 is made up of 16 byte-sized data objects. Respective input data object positions are indicated by the numerals 0 . . . 15 of the input data set 205.

All examples of data manipulation operations disclosed herein rely on a control word obtained based on information in the control field 260. The exemplary control word 209 includes 16 nibbles each of which is a HEX digit. The sequence of digits in the control word 209 controls the position of input data objects 205 in the sequence of the output data set 207. Respective output data object positions are indicated in FIG. 2 by the numerals 0 . . . 15 of the output data set 207. Specifically, the byte at position 0 in the output data set 207 comes from the value of the HEX digit in the first nibble 0 of the control word. The first nibble 0 thus specifies the byte position 0 . . . 15 in the input data set 205 which will be dealt to the first byte position 0 in the output data set 207. The second nibble 1 of the control word 209 specifies the byte position 0 . . . 15 in the input data set 205 which is dealt to the second position 1 in the output data set 207 . . . and so on.

The opcode field 250 also specifies whether the information in the control field is a general purpose register address or a location in the table 227. In this example, predetermined bits in the opcode field 250 can indicate that the value in the control field 260 relates to a location in a table 227 of control words. The table of control words is held in on-chip ROM 225. The table 227 of control words contains a predetermined number of useful control words which may be used to perform data manipulations of various types without a programmer having to derive them himself.

Alternatively, these predetermined instruction bits in the opcode field 250 may indicate that the value in the control field 260 relates to the general purpose register set 160. The control field 260 designates the address of the relevant general purpose register so that the control word can be fetched from the set of general purpose registers 160. In this way, the programmer can use his own control words by configuring a general purpose register and specifying the general purpose register in the control field 260.

In operation, the permuter 165 receives the control word 209 via a 64 bit bus 112A, the input objects 205 via the 64 bit busses 112B and 112C, and if applicable a control signal S/Z at control port 162. In the case of "normal" data deal operations, no control signal is generated. The permuter manipulates the input object set 205 according to the sequence of HEX digits in the control word 209. In the case of sign and zero expansion operations, the input block 164 of the permuter performs a data preparation task including a pre-manipulation so that, thereafter, a normal operation of the permuter according to the control word leads to the desired sign or zero expansion operation. The control word is programmed such that the manipulation of prepared data and input objects achieves the desired expansion operation, as will be described in more detail hereinafter.

In the case of a sign expansion operation, the signal S at the control port 162 causes the input block 164 to create sign bytes. The permuter 165 then uses the low bytes 0 . . . 7 of the input data set in combination with the new sign bytes in byte positions 8 . . . 15 to obtain sign extended output objects. If the decode/control circuitry 145 determines from the opcode field 250 that the operation is a zero expansion operation, it generates a control signal Z at the control port 162. The signal Z controls the input block 164 to create zero bytes. The permuter 165 then uses the low bytes 0 . . . 7 of the input data set 205 in combination with the new zero bytes in byte positions 8 . . . 15 to obtain zero extended output objects.

Figure 3:
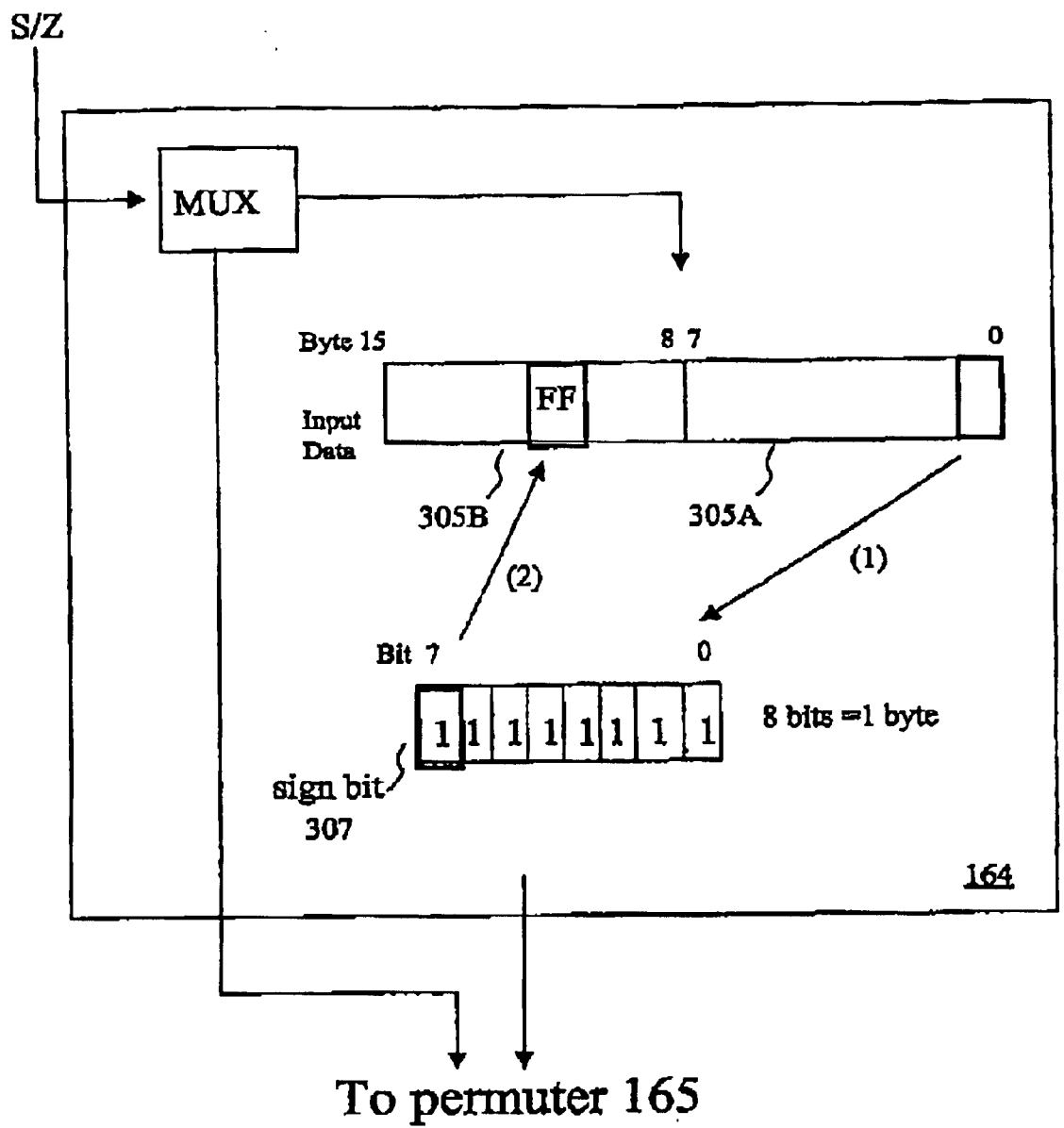
FIG. 3 is a schematic diagram which shows pre-manipulation registers as a part of the computer system of FIG. 1.

With reference to FIG. 3 the input block of the permuter 164 includes a multiplexer, MUX that selects one of the three input formats according to the instruction. For a sign expansion instruction, the multiplexer has the task of generating the sign bytes 8 . . . 15 of the input data 305B according to the sign bit 7 of each byte 0 . . . 7 in the input data 305A. First it propagates bit 7 (the sign bit) of each byte 0 . . . 7 of the input data 305A across all 8 bits of each of bytes 8 . . . 15 as shown in FIG. 3. The sign generation can be either positive or negative depending on the sign bit of the byte. For instance, a twos compliment binary number is negative if and only if the sign bit is set, otherwise it is positive. The sign bit is then replicated via buffers 8 times and a byte FF is obtained if the sign bit was negative or 00 if the sign bit was positive.

A different data preparation step is performed in the case of a zero expansion operation. In this case zeros are propagated across all 8 bits of each of bytes 8 . . . 15. A skilled person will appreciate there are a number of ways of implementing the input buffer 164 of the permuter and arrangements other than the multiplexer-register arrangement shown in FIG. 3.

Figure 5A:
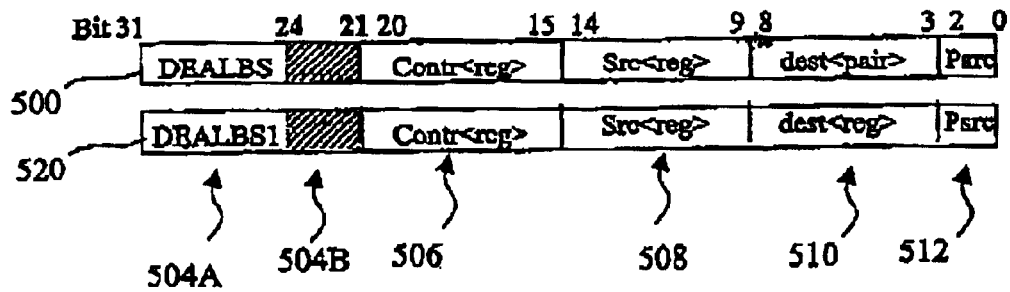
FIGS. 5A and 5B respectively show a sign-expansion type of data manipulation operation supported by the computer system of FIG. 1.
Figure 5B:
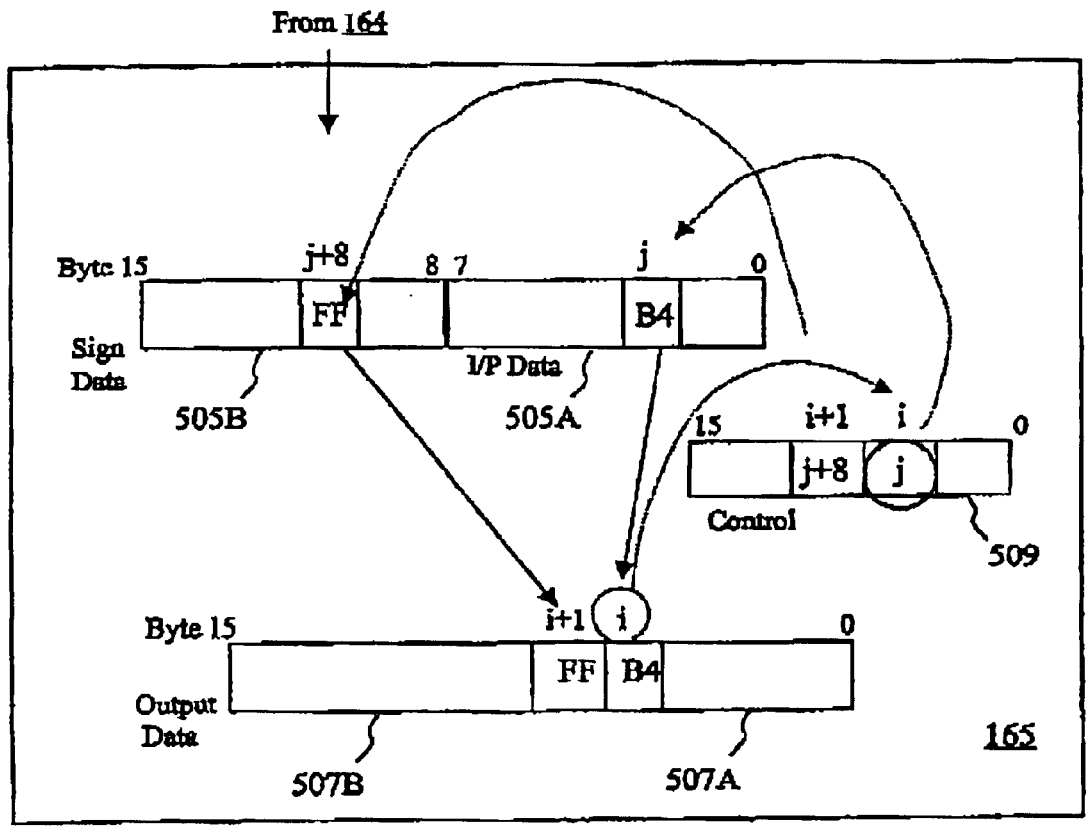
Figure 6A:
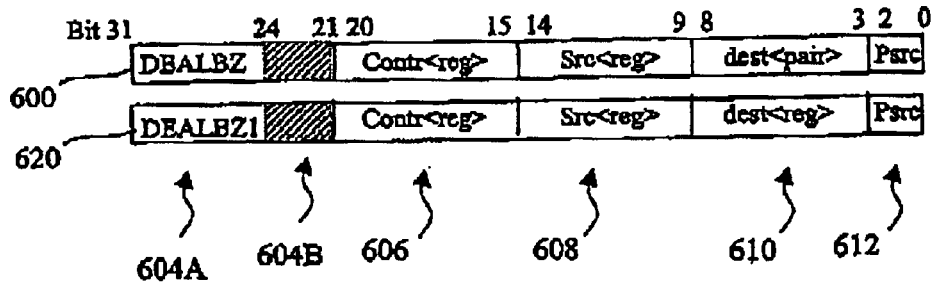
FIGS. 6A and 6B respectively show a zero-expansion type of data manipulation operation supported by the computer system of FIG. 1.
Figure 6B:
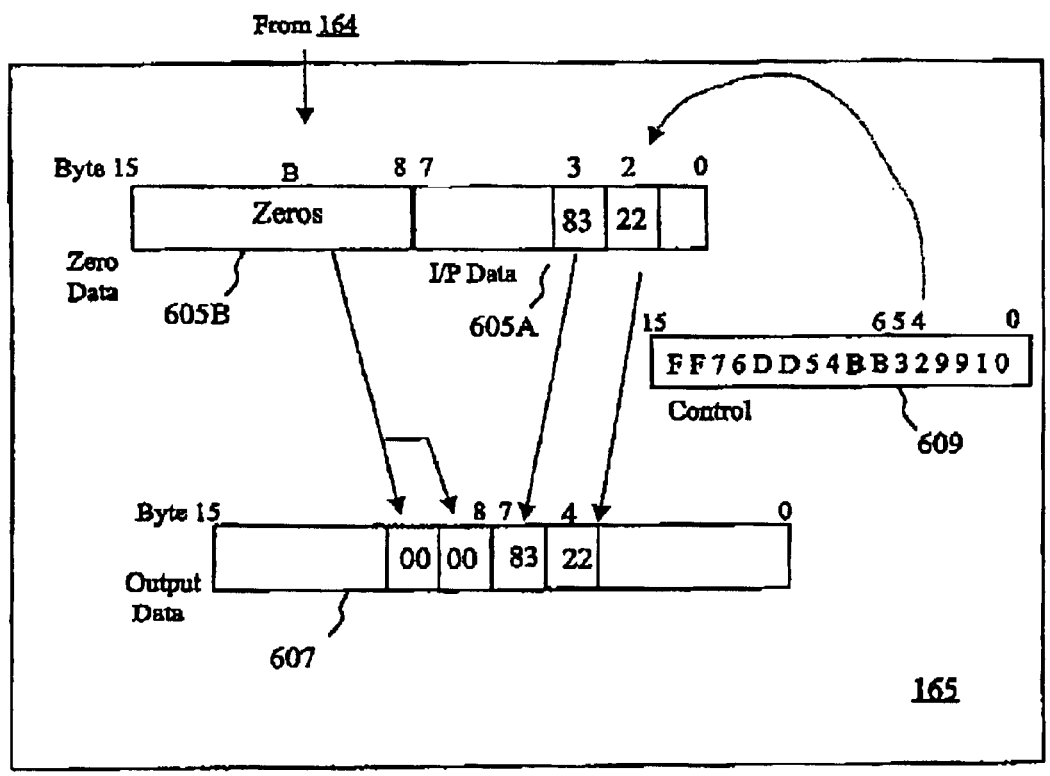

Various exemplary types of operations will now be described with reference to FIGS. 4A–6B. Specifically, FIGS. 4A and 4B illustrate the "normal" type of data deal operations mentioned hereinbefore, FIGS. 5A and 5B illustrate examples of sign expansion operations, and FIGS. 6A and 6B illustrate examples of zero expansion operations.

Figure 4A:
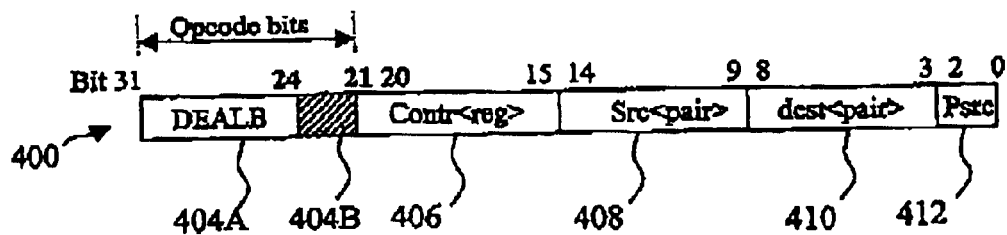
FIGS. 4A and 4B respectively show a general type of data manipulation operation supported by the computer system of FIG. 1.

The instruction shown in FIG. 4A is a DEALB instruction 400 which has an opcode field 404A/B, a first portion of the opcode field 404A (bits 31–25) defining the type of operation and a second portion of the opcode field 404B (bits 24–21) indicating which device holds the control value, in this embodiment either a general purpose register in the set 160 or the on-chip ROM 225, a control field 406 (bits 20 . . . 15) for indicating the location of a control word in the device indicated in the opcode field, a source field 408 (bits 14 . . . 9) designating a pair of source registers containing input data, a destination register field 410 (bits 8 . . . 3) for designating a pair of destination registers to receive output data objects, and an optional predicate field 412 (bits 2 . . . 0) indicating a predicate register 413. The predicate registers are used to perform operations selectively on a per SIMD lane basis. Such data manipulation operations can take any number of conventional forms, such as flips, swizzles, swaps and the like, or any specialized form according to the requirements of a given system, without departing from the scope of the present invention as defined in the claims. A detailed discussion of predication is not required in the context of this invention.

Figure 4B:
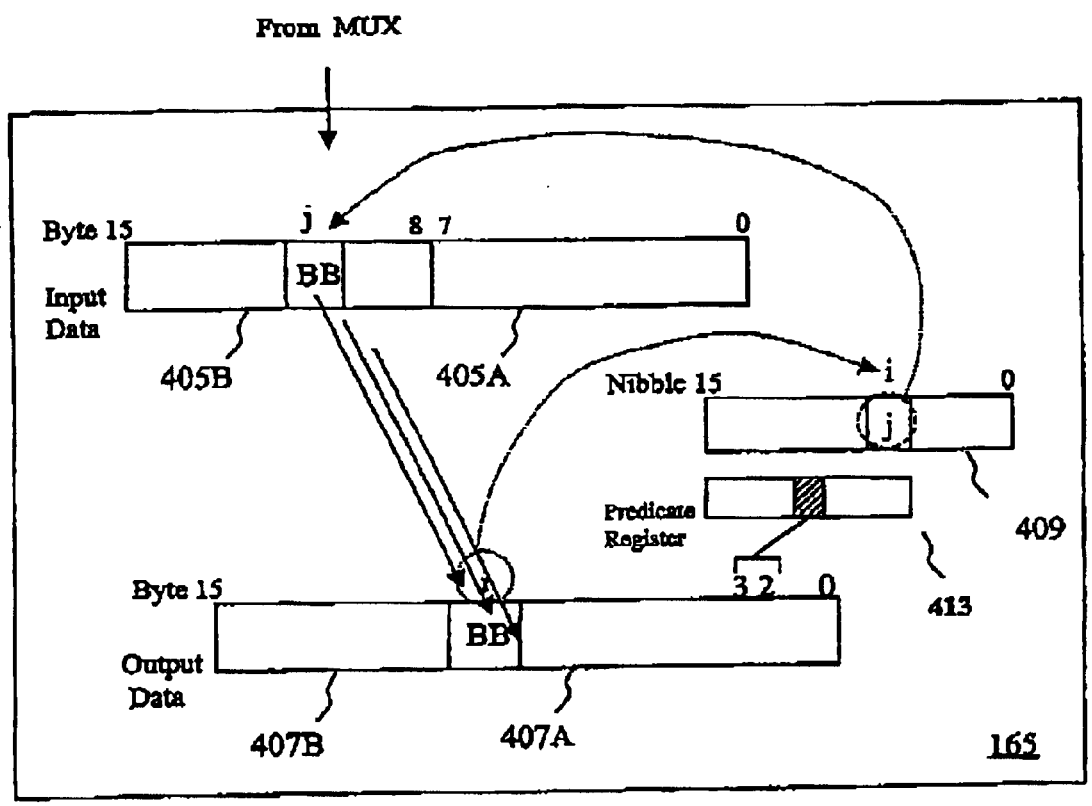

Referring to FIG. 4B, decoding such an instruction in the processor unit 110 would cause the 16 bytes of input data held in the source register pair 405A, 405B to be manipulated according to the HEX control word 409 designated in the instruction, with the 16 bytes of output data 407A, 407B being sent to the destination register pair designated in the instruction.

The control word 409 is a 16 nibble control value in HEX format. There is one HEX digit for each byte of the permuter output. As mentioned earlier, each nibble of the control word specifies the source byte for each of the respective destination byte positions. For example, the first HEX digit is written so that it indicates which source byte the first byte position of the output data set comes from. The next HEX digit corresponds to the next most significant byte of the output data set and identifies the source byte which it comes from . . . and so on. There is a HEX nibble corresponding to each byte position of the output data set. This is represented generally on FIG. 4B by showing the contents BB of the ith destination byte as controlled by the value of the ith HEX digit in the control word, which in this case points to the jth source byte. From this general explanation, a skilled person will readily appreciate that HEX control words can be designed to achieve any desired data manipulation.

Pseudo code for this general deal bytes operation is represented below:

```
FORALL i IN 0...15
    TempPair_Byte(i) := Src1Pair_Byte(Src2_Nibble(i))
ENDFOR
FORALL i IN 0...15
    IF Preg BIT (i/2) THEN
        DestPair_Byte(i) := TempPair_Byte(i)
    ENDIF
ENDFOR
```

FIG. 5A shows 32 bit instruction formats 500,520 for exemplary sign expansion manipulations. The first instruction 500 is a DEALBS instruction which has an opcode field 504A, 504B, of which a first portion 504A (bits 31–25) defines the type of operation and a second portion 504B (bits 24–21) defines the device from which the control value is to be fetched. There is also a control register field 506 (bits 20–15) for indicating the location of a control word, a source field 508 (bits 14–9) for designating a source register containing input data objects, a destination field 510 (bits 8–3) for designating a pair of destination registers to receive sign extended output data objects, and an optional predicate field 512 (bits 2–0) indicating a predicate register to control conditional performance of the data manipulation on a per SIMD lane basis.

With reference to FIG. 5B, the presence of the signal S at the control port 162 causes the input block 164 to perform the data preparation step such that the high eight bytes 8 . . . 15 are prepared as sign bytes 505B and the low eight bytes 0 . . . 7 of the input data 505A are input data bytes. The above-mentioned DEALBS instruction causes the permuter 165 to DEAL bytes sent by the input block 164 from the low byte positions 505A (bytes labeled 0 . . . 7) containing input data objects and the high byte positions 505B (bytes labeled 8 . . . 15) containing sign bytes. The general data manipulation of the input data objects and associated sign bytes by the permuter 165 is controlled according to the sequence of digits in the HEX control word 509 (labeled nibbles 0 . . . 15) in the same way as described in respect of a normal data deal operation.

Successive nibbles i in the control word 509 specify the source byte number j for consecutive output data bytes 0 . . . 15 in the output data set 507. The relevant sign data j+8 is added from the sign data 505B of the input data set, such that the desired combination between each input data byte 505A and its sign byte 505B is output. Similar relationships apply for each control nibble 0 . . . 15 the control word 509 such that eight 16-bit half words are obtained from the eight input bytes. Any desired site of output objects can be generated with judicious selection of parameters.

As described hereinbefore, the sign bytes 505B are a sequence of bytes with the values 00 or FF, which values indicate the sign bits of the corresponding respective bytes of the input data 0 . . . 7 with respect to the output data objects 507. The data set including the data and sign subsets 505A, 505B are thus manipulated according to a suitable control word 509 to achieve sign extended output objects. The control word is programmed such that a given input data object is sign extended with the relevant sign data object. In this example the value of the sign data 505B in the position j+8 is FF, therefore the position i+1 of the control word 509 is j+8.

Thus in general, respective nibbles i of the control word specify the source byte number j and associated sign byte j+s of the corresponding destination bytes; given that s is a predetermined number between 8 and 15. In the example of FIGS. 5A and 5B, the value of s is 8 because the data objects are bytes. A skilled person will appreciate that for different sized data objects other values of s may be required. In this way, the same device can perform sign extension for any size data objects (byte, half word, word, long) to any large size object (half word, word, long, double long) by appropriate choice of control word. It will be apparent that the value in the control register should be programmed such that the sign byte for input byte j (0 . . . 7) is in the input byte position j+s (8 . . . 15) of the input data set. Furthermore, the relationship between j and j+8 is an implied one that is determined by how the inputs to the permuter are manipulated in this exemplary embodiment. This input configuration should not limit the scope of the invention as defined in the claims.

The 16 nibble control value in HEX format is therefore designed specifically to cause the type of data manipulation desired. For example, to sign extend the eight input bytes to eight 16-bit half words, the control word is: 0xF7E6D5C4B3A29180.

Pseudo code for this DEALBS operation is represented below:

With reference to FIGS. 6A and 6B, the DEALBZ 600 and DEALBZ1 620 instructions are zero expansion operations. The DEALBZ and DEALBZ1 instructions 600, 620 have fields 604A, 604B, 606, 608, 610 and 612 which correspond to those described in relation to the sign expansion instructions 500,520. For example a DEALBZ instruction causes the permuter 165 to combine bytes sent by the input block 164 from the low byte positions 605A (labeled 0 . . . 7) containing input data objects and the high byte positions 605B (labeled 8 . . . 15) containing zeros. The presence of the signal Z at the control port 162 indicates to the permuter 165 that the low eight bytes 0 . . . 7 of the input data 605A are to be zero extended using the zeros from the high eight bytes 8–15 in the zero data set 605B. In the example of FIG. 6B, a 16 nibble HEX control word with the value of FF76DD54BB329910 is able to zero extend the eight input bytes to eight 16-bit half words. A skilled person will readily appreciate that a number of control words can be used to achieve such manipulations.

```
FORALL i IN 0...15
    TempPair_Byte(i) := {SignsOfBytes(Src1) Concat Src1}_Byte(Src2_Nibble(i))
ENDFOR
FORALL i IN 0...15
        IF Preg BIT (i/2) THEN
            DestPair_Byte(i) := TempPair_Byte(i)
        ENDIF
ENDFOR
```

The further instruction format 520 in FIG. 5A defines a DEALBS1 operation. The DEALBS1 instruction 520 has several fields in common with the DEALBS instruction 500 described above, namely fields 504A, 504B, 506, 508 and 512. These common fields have the same purpose as in the DEALBS instruction 500. Turning to the different fields, the destination field 510 of a DEALBS1 operation is defined to designate a single register (bytes labeled 0 . . . 7) for receiving the sign extended data objects. Therefore in a DEALBS1 operation bytes are dealt from the low byte positions 505A (labeled 0 . . . 7) containing input bytes and the sign byte positions 505B (labeled 8 . . . 15) containing sign information, each sign byte being a sequence of bytes with the values 00 or FF, to a provide a single output data set 507A (bytes labeled 0 . . . 7) according to a control word 509.

Pseudo code for the DEALBS1 instruction reads as follows:

The zero bytes are a sequence of bytes with the value 00. By way of example, the control word 609 has at position 4 a control value 2 that points to the input data "22" in position 2 of the input data set 605A. The value in position 4 of the control value controls what input data position goes to the 4th position of the output data set 607, allowing each nibble in the control word to specify the source byte number 2 by the respective output data byte number 4. In this way, the zero data objects 605B are combined with the input data objects 605A, in order to zero extend each input data object. These steps apply for each position of the control word so all input data objects 605A are zero extended and placed in whatever output byte position is desired.

Pseudo code for the DEALBZ instruction reads as follows:

```
FORALL i IN 0...7
    Temp_Byte(i) := {SignsOfBytes(Src1) Concat Src1}_Byte(Src2_Nibble(i))
ENDFOR
FORALL i IN 0...7
    IF Preg BIT i THEN
        Dest_Byte(i) := Temp_Byte(i)
    ENDIF
ENDFOR
```

```
FORALL i IN 0...15
    TempPair_Byte(i) := {0x0000000000000000 Concat Src1}_Byte(Src2_Nibble(i))
ENDFOR
FORALL i IN 0...15
    IF Preg BIT (i/2) THEN
        DestPair_Byte(i) := TempPair_Byte(i)
        ENDIF
    ENDFOR
```

The instruction format 620 for DEALBZ1 shown in FIG. 6A has most fields in common with the DEALBZ instruction, namely fields 604A, 604B, 606, 608 and 612. These common fields have the same definition as in the DEALBZ instruction 600. However, the field 610 is defined as a single destination register (bytes 0 . . . 7) instead of a pair destination registers (0 . . . 15).

Pseudo code for the DEALBZ1 instruction reads as follows:

```
FORALL i IN 0...7
    Temp_Byte(i) := {0x0000000000000000 Concat Src1}_Byte(Src2_Nibble(i))
ENDFOR
FORALL i IN 0...7
    If Preg BIT i THEN
        Dest_Byte(i) := Temp_Byte(i)
        ENDIF
ENDFOR
```

Figure 7:
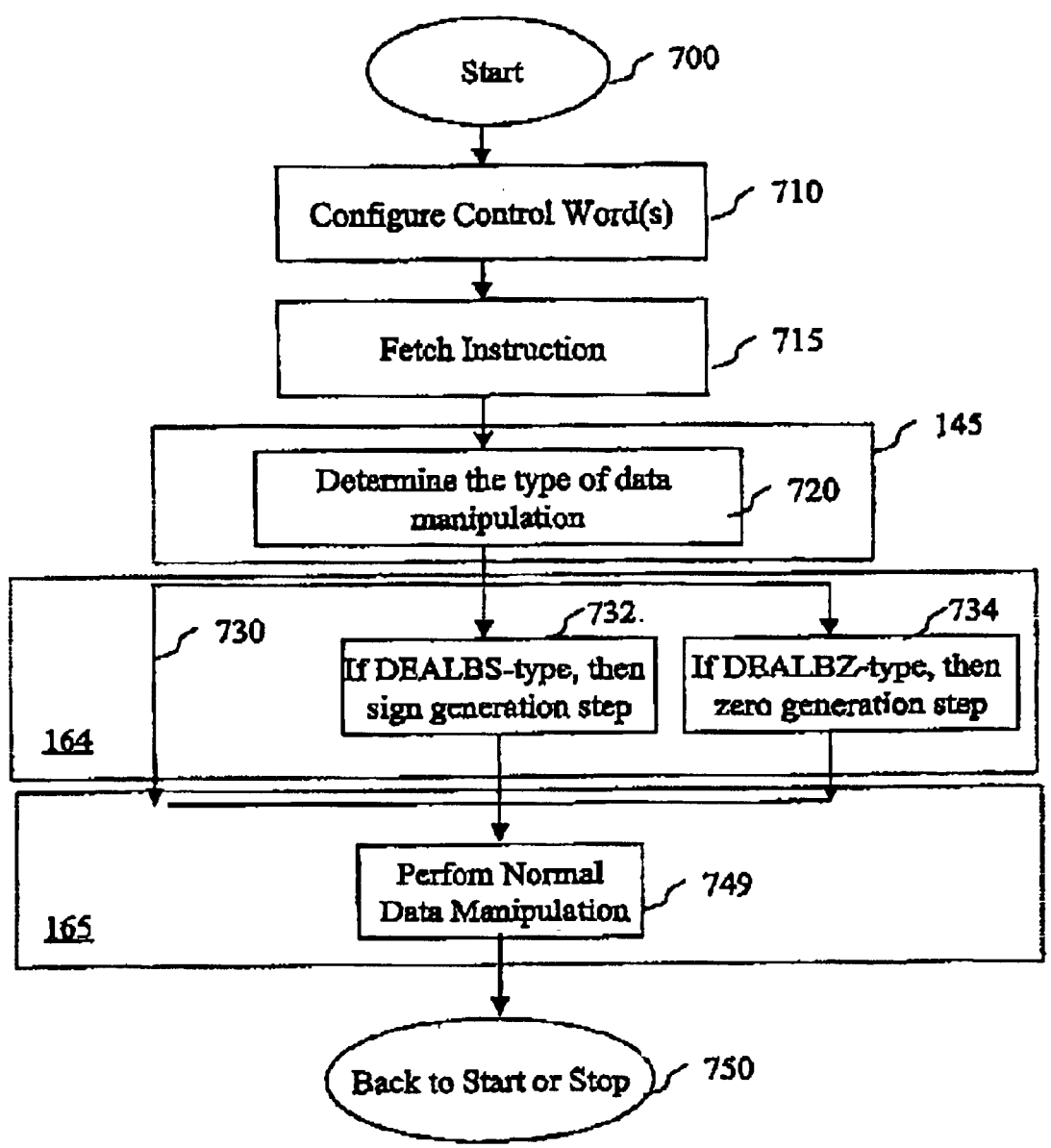
FIG. 7 is a flow chart illustrating the steps performed in a data manipulation operation of the computer system of FIG. 1.

FIG. 7 depicts a flowchart outlining the preferred technique for performing data manipulation operations and/or expansion operations according to this embodiment of the present invention. The process starts at step 700 in which the programmer decides whether to configure his own control word or rely on a control word in the table of control words held in the on-chip ROM. At step 710 a control word in a particular device, e.g. the general purpose register set 160 or on-chip ROM 225, is identified for use in the data manipulation operation and an instruction designating its the device is stored.

Next is step 715 in which a desired data manipulation instruction is fetched from a location in the designated device. At box 720, the instruction is decoded to determine the type of data manipulation and accordingly whether and what type of data preparation step is required.

The functionality of the input block 164 ahead of the permuter 165 in this embodiment is represented as alternative process flows 730,732,734. One of these alternative process flows, step 730 is the DEALB-type. This operation is active only if the data manipulation instruction is a "normal" data manipulation. The permuter proceeds in the case of a DEALB type operation by manipulating the data according to the control word in the specified device (step 749) and outputting the results.

On the other hand, if the data manipulation operation is a DEALBS-type sign expansion operation, as in step 732, the permuter proceeds by first performing a data preparation step to generate sign bytes and then manipulating the input data 505A in combination with the sign objects 505B according to the control word in the specified device (see step 749).

With reference to step 734, if the data manipulation operation is a DEALBZ-type zero expansion operation, the permuter proceeds by first performing a data preparation step to generate zero bytes (step 734) and then manipulates the input data 605A in combination with the zero-value objects 605B of the input data 605, according to the control word in the specified device (see step 749).

Thereafter, control proceeds to step 750 where it is determined whether or not a further data manipulation operation is required. If another data manipulation operation is to be performed, control jumps back to step 700; otherwise, control stops.

For all the described embodiments of this invention the permuter 165 does not have any knowledge of the format of the input data set. The data preparation step of the input block 164 has no format knowledge and its only task is to make sign expansion objects, zero expansion objects or to retain the format in the original data format. That is, the "Perform Normal Data Manipulation" step 749 is done in all cases based on an identical control mechanism, notwithstanding the selection of control word which will vary to achieve the desired output objects. Where employed, the pre-manipulation steps 732,734 which generate the sign or zero extension bits cause the normal permute operation 749 to achieve sign or zero extension by virtue of the modification to the data coming into it.

Further, there is no need for all these embodiments to manipulate all the input data in order to obtain the desired output data. This is particularly relevant for circuitry with big-endian data storage, where only the control values need to be changed in the on-chip ROM. In addition, this invention makes it possible not to only change the values in big-endian data storage devices but also allows transformation of endianess and data expansion at the same time.

It will be apparent that preferred methods and devices permit sign and zero expansion of input objects of any predetermined size (byte, half word, word, long . . . ) to any larger size (half word, word, long, double long . . . ) by appropriate pre-programming of a control value. These examples are not limiting. There is not necessarily a one-to-one mapping between expansion objects used and input and/or output objects. For example, a sign extension from half word to word takes the sign extension of the top byte of the half word and ignores the sign extension of the bottom byte of the word.

Since the same fundamental permute is done in all cases, then it is efficient to code the different types of DEAL operations in an op-code, thus allowing more op-code space to encode other instructions for a multi-execution system. The shared designation of the bits in the opcode field across the different styles of DEAL and other instructions make it possible to more efficiently run other instructions at the same time as the permutation operation. In multiple-execution channel implementations with two or more execution channels, designated X and Y, the processor can read or write a limited number of registers per cycle. Sharing the opcode fields it makes possible to handle two different instructions at the same time, one on each side X,Y of the registers. Exemplary dual execution systems are described in GB-A-2352066.

The variations on the DEALB instruction (the Z/S vs normal forms on input and the 1 form on output) allow different numbers and sizes of input register and output register to be used that thus frees up registers for the dualed operation. But nevertheless the actual permuter does the same operation in all cases on the full 128 bits.

For instance a situation can be envisaged where the X-side operation in a DEALBS/Z instruction reads two registers and writes one while the Y-side reads and writes one register. A normal DEALB instruction reads three registers (an input pair and a control register) and writes two registers (an output pair). This allows these operations to run on both execution channels (sides) at the same time. For example:

DEALBS Rd0/Rd1, Rs, Rc: LDL Re, [Rb,#4]

In this case the X-side of the machine reads two registers (Rs, Rc) and writes two registers (Rd0, Rd1), while the Y-side reads one register (Rb) and writes one (Re). The benefit of DEALBS1 is that only half of the register capability is used.

Therefore it is possible to write code such as:

DEALBS1 Rd, Rs, Rc: LDL2 Rp0/Rp1, [Rb,#4]

using the permuter with fewer registers and allowing the dual load.

In various embodiments where the above-described systems and/or methods are implemented using a programmable device, such as a computer-based system or programmable logic, it should be appreciated that the above-described systems and methods can be described by any of various known or later developed programming languages, such as Assembly.

Various storage media, such as magnetic computer disks, optical disks, electronic memories and the like, can be prepared that can contain information that can direct a device to implement the above-described systems and/or methods. Once an appropriately capable device has access to the information contained on the storage media, the storage media can provide the information to the device, thus enabling the device to perform the above-described systems and/or methods.

In still other embodiments, rather than providing a fixed storage media, such as a magnetic-disk, information describing the above-described systems and methods can be provided using a communication system, such as a network or dedicated communication conduit. Accordingly, it should be appreciated that various programs, executable files or other information embodying the above-described systems and methods can be downloaded to a programmable device using any known or later developed communication technique.

As shown in FIGS. 1–6B, the systems and methods of this invention are preferably implemented within a computer having various complimentary components and peripherals. However, the systems and methods can also be implemented using any combination of one or more general purpose computers, special purpose computers, program microprocessors or microcontroller and peripheral integrating circuit elements, hardware electronic or logic circuits such as application specific integrated circuits (ASICs), discrete element circuits, programmable logic devices such as PLAs, FPGAs, PALs or the like. In general, any device on which exists a finite state machine capable of implementing the various elements of FIGS. 1–6B and/or the flowchart of FIG. 7 can be used to implement the various functions. While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are other changes that may be made without departing from the invention as defined in the claims.

What is claimed is:

1. A method of performing a data expansion operation on a plurality of input data objects to generate expanded output data objects, the method comprising:

receiving and decoding a data manipulation instruction defining a data expansion operation, a portion of the data manipulation instruction indicating an expansion operation from a number of predetermined types of data manipulation operations;

responsive to the indication of an expansion operation, generating one or more expansion objects, said one or more expansion objects being for use in extending an input data object; and manipulating said input data objects and said expansion objects according to control information programmed to produce a set of expanded output data objects.

2. A method as in claim 1, wherein the control information comprises a sequence of control digits, the position of each control digit in the sequence corresponding to a position in the expanded output data object set and the value of each control digit indicating a position of an input data object or an expansion objection.

3. A method as in claim 2, wherein the control information is programmed such that a plurality of control digits specifies the same input data object or expansion object.

4. A method as in claim 2, wherein the control information is programmed such that one or more of said input data objects or expansion objects is not included in said set of expanded output data objects.

5. A method as in claim 1, wherein the data manipulation instruction defines a sign expansion operation and the step of generating said one or more expansion objects involves generating at least one sign object associated with an input data object.

6. A method as in claim 5, wherein the control information is programmed such that consecutive control digits respectively specify an input data object position and an associated sign object position.

7. A method as in claim 1, wherein the data manipulation instruction defines a zero expansion operation and the step of generating said one or more expansion objects involves generating at least one zero object.

8. A method as in claim 7, wherein the control information is programmed such that consecutive control digits thereof respectively specify an input data object position and an associated zero object position.

9. A method as in claim 1, wherein the data manipulation instruction comprises a field designating one of a plurality of devices for holding said control information and a field indicating where in the designated device the control information is held.

10. A method as in claim 9, wherein pre-programmed control information is held in one or more of said designated devices.

11. A method as in claim 8, wherein a plurality of pre-programmed control words are held in a table on the same chip as the or each device performing the data manipulation operation.

12. A method as in claim 9, wherein control information is held in one or more registers which is configurable by a user.

13. A data manipulation instruction comprising an opcode field defining a data operation out of a number of predetermined data manipulations that include data manipulations without expansion,
wherein the data manipulations include any of (a) rearranging a set of input bytes to produce a set of output bytes in a different sequence and (b) data compression, and
wherein input and output data objects are transferred between registers in a computer system comprising a plurality of execution channels, and wherein a portion of said data manipulation instruction limits register access width such that remaining register access width is available for other operations running contemporaneously..

14. A method as in claim 1, wherein an input data object selected from one or more of a byte, half word, word or long word is expanded into a larger output data object selected from one or more of a half word, word, long or double long.

15. A device for performing a data expansion operation on a plurality of input data objects to generate expanded output data objects, the device comprising:
a decoder for receiving and decoding a data manipulation instruction defining a data expansion operation, a portion of the data manipulation instruction indicating an expansion operation from a number of predetermined types of data manipulation operations;
an expansion object generator operable to generate one or more expansion objects responsive to the indication of an expansion operation, each expansion object being available for use in extending an input data object; and
a manipulation stage operable to manipulate said input data objects and said expansion objects according to control information programmed to produce a set of expanded output data objects.

16. A method of performing a data expansion operation on a plurality of input data objects, the method comprising determining from an instruction whether a data expansion operation is required from a plurality of predetermined data manipulation operations including permute operations without data expansion, generating expansion objects in dependence on said determination indicating a data expansion operation is required, and controlling manipulation of said input data objects and said expansion objects to provide expanded output objects.

17. A method of manipulating a plurality of input data objects to generate an output data set comprising a plurality of output data objects according to control information, the control information controlling relative positions of respective ones of the output data objects in the output data set, the method comprising:
receiving and decoding a data manipulation instruction defining a data manipulation operation, the data manipulation instruction comprising a field designating one of a plurality of devices for holding said control information and a field specifying the location of the control information in the designated device; and
manipulating data according to the control information from the specified location in the designated device to produce the output data objects of an output data set; and
outputting the output data set.

18. A data manipulation instruction comprising an opcode field defining a data manipulation operation and designating one of a plurality of devices holding said control information and a control field indicating where in the designated device the control information is held,
wherein the data manipulation operation includes data expansion.

19. A method of manipulating a plurality of input data objects to generate an output data set comprising a plurality of output data objects according to control information, the control information controlling relative positions of respective ones of the output data objects in the output data set, the method comprising:
receiving and decoding a data manipulation instruction defining a data manipulation operation, the data manipulation instruction indicating the type of data manipulation operation to be performed from a number of predetermined types of data manipulation operations;
performing, in dependence on the type of data manipulation operation indicated in the data manipulation instruction, a data preparation step to generate a set of prepared data objects including said input data objects;
manipulating the prepared data objects according to control information to produce output data objects of an output data set; and
outputting the output data set.

20. A method as in claim 19, wherein the data preparation step comprises generating new data objects for a data expansion operation.

21. A method as in claim 19, wherein the manipulation technique employing the control information to determine the position of objects in the output data object set is identical irrespective of whether the overall manipulation is permute without data expansion or data expansion operations.

22. A method as in claim 19, wherein the manipulation technique employing the control information to determine the position of objects in the output data object set is identical irrespective of whether the overall manipulation is a permute without data expansion, a sign expansion or a zero expansion operation.

23. The instruction of claim 18, wherein the data manipulation includes any of (a) rearranging a set of input bytes to produce a set of output bytes in a different sequence and (b) data compression.

* * * * *

UNITED STATES PATENT AND TRADEMARK OFFICE
CERTIFICATE OF CORRECTION

PATENT NO.       : 6,975,250 B2                                    Page 1 of 1
APPLICATION NO. : 10/288,592
DATED            : December 13, 2005
INVENTOR(S)      : Sophie Wilson It is certified that error appears in the above-identified patent and that said Letters Patent is hereby corrected as shown below:

<u>Column 14</u>
Line 32, please replace "said expansion" with --the one or more expansion--.

<u>Column 15</u>
Line 27, please delete the extra period.
Line 31, please replace "double long." with --double long word.--.

<u>Column 16</u>
Line 6, please replace "holding said" with --holding the--.
Line 11, please replace "of an" with --of the--.
Line 16, please delete "said".
Line 37, please replace "said" with --the--.
Line 39, please replace "to produce output data objects of an" with --to produce the output data objects of the--.

Signed and Sealed this

Eighth Day of August, 2006

JON W. DUDAS
*Director of the United States Patent and Trademark Office*